P. CAMINONI.
BAT FOR CRICKET, &c.
No. 42,834.
Patented May 24, 1864.
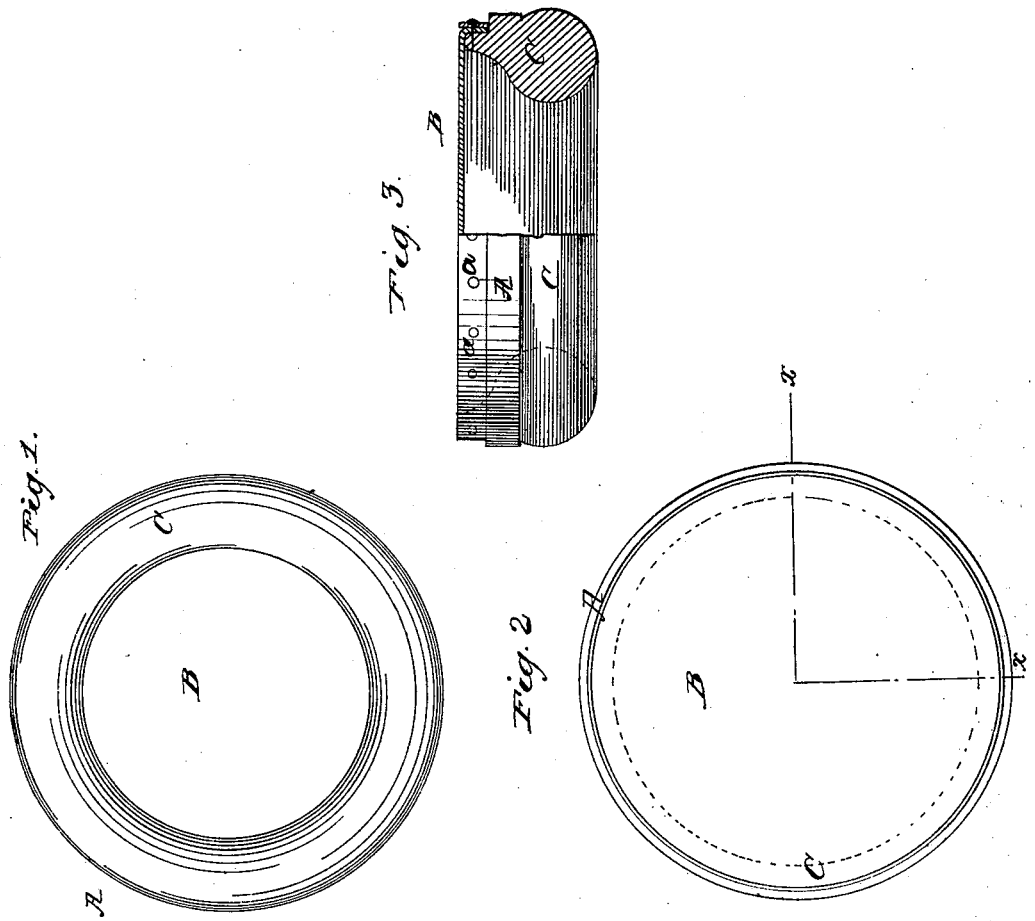

UNITED STATES PATENT OFFICE.

PHILIP CAMINONI, OF NEW YORK, N. Y.

BAT FOR CRICKET, &c.

Specification forming part of Letters Patent No. 42,834, dated May 24, 1864.

*To all whom it may concern:*

Be it known that I, PHILIP CAMINONI, of the city, county, and State of New York, have invented a new and Improved Bat for Cricket, &c.; and I do hereby declare that the following is a full, clear, and exact description of the same, reference being had to the accompanying drawings, forming a part of this specification, in which—

Figure 1 represents an inverted plan of my invention. Fig. 2 is a plan or top view of the same. Fig. 3 is a transverse section of the same, the line $x\ x$, Fig. 2, indicating the plane of section.

Similar letters of reference in the three views indicate corresponding parts.

This invention consists in the employment or use of a circular, oval, or polygonal frame covered by a piece of parchment or skin of an ass, swine, or other animal, and bulges out at its lower edge in such a manner that it affords a convenient hold for the hand, and a simple, durable, and effective substitute is produced for the ordinary bat used in cricket and other similar plays.

To enable those skilled in the art to make and use my invention, I will proceed to describe it.

A represents a circular, oval, or polygonal frame, made of wood or any other suitable material and covered by a piece, B, of parchment or of thin and elastic skin of an ass, swine, or other animal, similar to the skin used for drum-heads. This head is drawn tight across the frame, and turned down over its edge and secured by nails $a$, or in any other suitable manner, as firm and durable as possible.

The lower edge of the frame A is furnished with a swell, C, all around, so that the same affords a convenient hold to the hand and can be used with good effect in catching a ball before it reaches the ground, and sending the same back to the opposing party.

By means of this frame or bat the ordinary cricket can be transferred from the ground in the air, the rules of the play being altered and adapted to the new order of things. Two opposing parties, each of three or more men, post themselves at suitable distances in the field. One party strikes and sends the ball in the air to the other, and it is the duty of the opposing party to return the same before it reaches the ground. If one party suffers the ball to reach the ground it loses one point, and so forth.

It is obvious that this mere outline of the rule can be changed at pleasure, but by means of my improved bat the cricket and other similar plays can be rendered much more lively and animated than with the ordinary bat, which serves to strike the ball after it has reached the ground.

It is not necessary to remark that the frame A can be made in various forms and sizes to suit taste and convenience of buyers, and I do not wish to confine myself to the precise form or shape shown in the drawings.

What I claim as new, and desire to secure by Letters Patent, is—

The employment or use of the frame A, provided at its under edge with a swell, C, and covered with a head, B, similar to a drum-head, substantially in the manner specified, to serve as a substitute for the ordinary bat used in cricket and other similar plays.

PHIL. CAMINONI.

Witnesses:
JAS. P. HALL,
GEO. W. REED.